S. LAHM.

Sheep Rack.

No. 54,371.

Patented May 1, 1866.

WITNESSES

INVENTOR

UNITED STATES PATENT OFFICE.

S. LAHM, OF CANTON, OHIO.

IMPROVEMENT IN SHEEP-RACKS.

Specification forming part of Letters Patent No. 54,371, dated May 1, 1866.

*To all whom it may concern:*

Be it known that I, SAMUEL LAHM, of Canton, in the county of Stark and State of Ohio, have invented certain new and useful Improvements in Sheep-Racks; and I do hereby declare the following to be a full, clear, and exact description of the same, reference being had to the accompanying drawings, making a part of this specification, in which—

Figure 1:
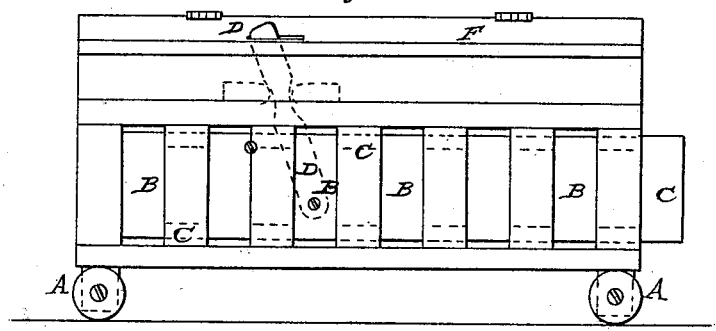
Figure 2:
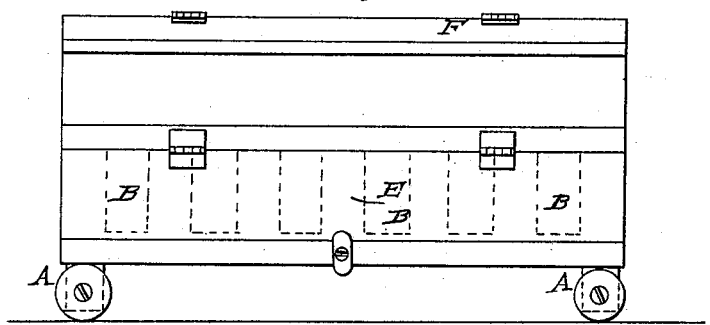
Figure 3:
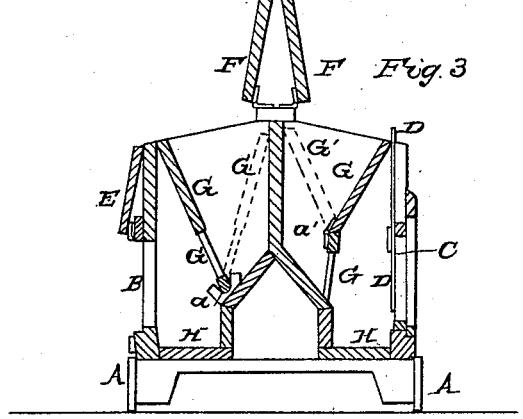

Figures 1 and 2 represent elevations of opposite sides of the rack; and Fig. 3 represents a vertical transverse section through the rack, showing its interior arrangement and operation.

Similar letters of reference where they occur in the several figures denote like parts of the rack in all the drawings.

My invention consists in an arrangement of hinged covers, racks, or rack-boards and hinged or sliding sides with regard to said racks and grain-troughs, so that the food may be appropriately distributed, and the rack opened or closed, as may be desired.

To enable others skilled in the art to make and use my invention, I will proceed to describe the same with reference to the drawings.

The sheep-rack may be made movable, for field purposes, or may be a fixture, as preferred, and though I have represented it as made double, it is obvious that they may be made single, if so preferred.

For the purposes of transportation the structure is mounted on wheels A.

The sides are furnished with a series of openings, B, large enough to allow the animal to introduce its head while feeding, and to prevent crowding. These openings are furnished with a slide, C, as shown in Fig. 1, which may be moved by a lever, D, to shut off the sheep from the rack after they have been fed, or with a hinged door, E, as shown in Figs. 2 and 3, which serves a similar purpose.

On top of the structure are hinged doors F, for gaining access to the interior for the introduction of hay or stalks in their proper or separate apartment, or for the introduction of grain into its special receptacle, as may be desired. For this purpose I hinge the rack G, as at $a$, so that when it is in the position shown in full and sectional lines to the left of Fig. 3, the hay or stalks thrown in at the top will be caught and held in the rack in the usual way.

When, however, it is desired to put grain or salt into the grain-trough H, the rack is swung into the position shown by the dotted lines, and then such grain or other article thrown in at the top will fall and be guided into said trough, where the animals have access to it through the openings B, above described; or, instead of hinging and moving the whole rack, the rack-board G′ only may be moved, while the rack proper, G, may remain stationary. In such case the hinges are placed at $a'$, and when the rack-board is in the position shown in full and sectional lines to the left of Fig. 3, the hay or stalks thrown in at the top will be caught and retained in the rack; but when grain or other material is to be introduced into the grain-trough H, then the rack-board G′ is moved into the position shown by the dotted lines, which opens the passage for such grain and other material directly to the grain-trough. Thus the rack itself or the rack-board is the means by which the hay or stalks are directed and retained in their proper place, or by which the grain or other material is introduced into the grain-trough, as may be desired.

Having thus fully described my invention, what I claim therein as new, and desire to secure by Letters Patent, is—

In combination with sheep-rack, such as described, the arrangement of the hinged covers F hinged racks or rack-boards G G′, and hinged or sliding sides E C with regard to said racks and the grain-trough H, so that the food may be appropriately distributed, and the sheep-rack opened or closed in whole or in part, as herein described, and for the purpose set forth.

SAMUEL LAHM.

Witnesses:
W. W. CLARK,
B. F. LEITON.